(12) United States Patent
Valliappan et al.

(10) Patent No.: US 9,455,867 B2
(45) Date of Patent: Sep. 27, 2016

(54) AUTOMATIC CONFIGURATION OF A REPEATER

(71) Applicant: Broadcom Corporation, Irvine, CA (US)

(72) Inventors: Magesh Valliappan, Austin, TX (US); Sameer Kanhaiyalal Shah, Austin, TX (US); Sundararajan Chidambara, Austin, TX (US); Anand Kumar Pathak, Austin, TX (US)

(73) Assignee: BROADCOM CORPORATION, Irvine, CA (US)

( * ) Notice: Subject to any disclaimer, the term of this patent is extended or adjusted under 35 U.S.C. 154(b) by 171 days.

(21) Appl. No.: 14/136,435

(22) Filed: Dec. 20, 2013

(65) Prior Publication Data

US 2015/0146744 A1 May 28, 2015

Related U.S. Application Data

(60) Provisional application No. 61/908,951, filed on Nov. 26, 2013.

(51) Int. Cl.
*H04L 12/24* (2006.01)

(52) U.S. Cl.
CPC .................................. *H04L 41/0809* (2013.01)

(58) Field of Classification Search
None
See application file for complete search history.

(56) References Cited

U.S. PATENT DOCUMENTS 8,576,727 B2 * 11/2013 Diab et al. ..................... 370/242
2003/0120852 A1 * 6/2003 McConnell et al. ........... 710/316

* cited by examiner

*Primary Examiner* — Rhonda Murphy
(74) *Attorney, Agent, or Firm* — Oblon, McClelland, Maier & Neustadt, L.L.P (57) ABSTRACT

Embodiments of the present disclosure provide an in-band process to inform an external repeater of a desired new configuration or mode of operation. After negotiation of rate and other information during an auto-negotiation routine, a network node sends configuration information to a network element, such as an external network repeater.

20 Claims, 5 Drawing Sheets

AUTOMATIC CONFIGURATION OF A REPEATER

CROSS-REFERENCE TO RELATED APPLICATION

This application claims priority to copending U.S. provisional application entitled, "Automatic Configuration of a Repeater," having Ser. No. 61/908,951, filed Nov. 26, 2013, which is entirely incorporated herein by reference.

BACKGROUND

Ethernet links are point to point connections where endpoints or network nodes often auto-negotiate (AN) link speeds and other properties with each other in plug and play environments. Repeaters may be added to some links between the endpoints to extend the length of the link or to use a specific medium not supported by the endpoint. Using a repeater in an auto-negotiation environment poses challenges in communicating control and status information associated with the auto-negotiation protocol.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
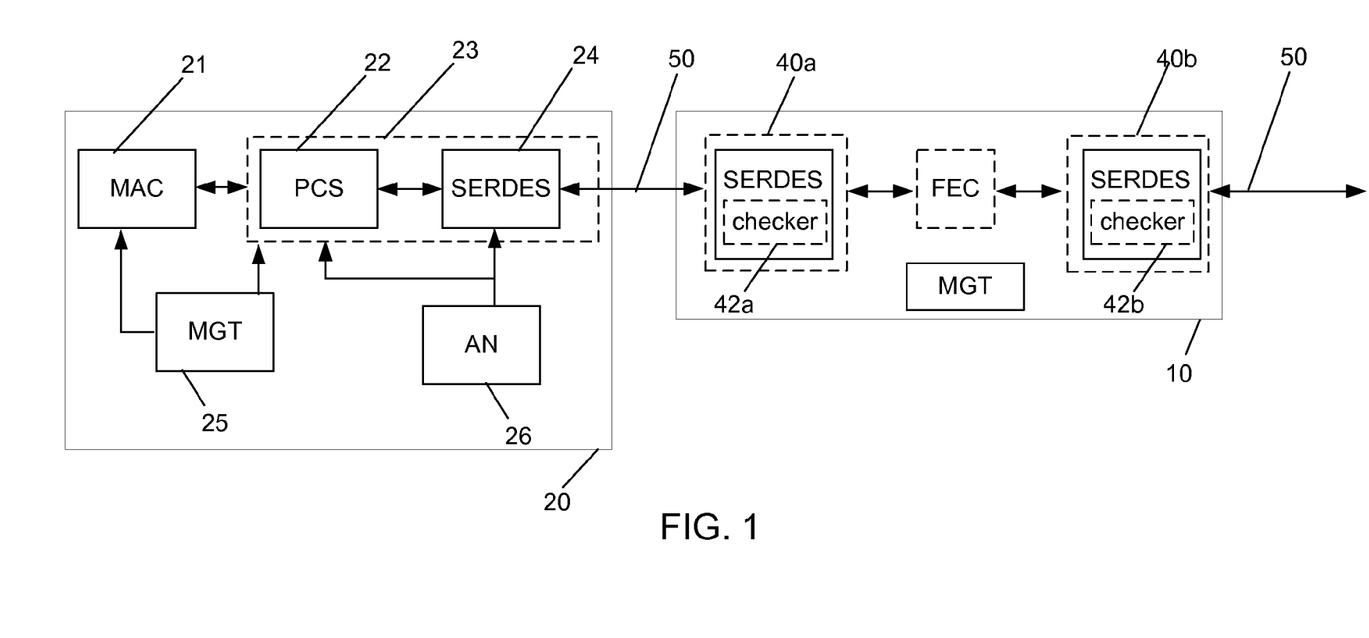
FIG. 1 is a block diagram of a network repeater configured for transmitting data packets between a network node and a remote network node according to an embodiment of the present disclosure.

Embodiments of the present disclosure provide an in-band process to inform an external repeater of a desired new configuration or mode of operation. FIG. 1 is a block diagram of a network repeater 10 configured for transmitting data packets between a network node 20 and a remote network node 30 (FIG. 3) according to an embodiment of the present disclosure. In one embodiment, the network repeater 10 is a fully integrated multiple port repeater that can operate at both 10 Gb/s and 100 Gb/s. An exemplary repeater 10 may include multiple repeater ports 40 (40a, 40b) that transmit and receive data packets with the respective remote network nodes 20, 30 according to IEEE 802.3 protocol. For illustration purposes, FIG. 1 depicts, but is not limited to having, two repeater ports 40a, 40b. In an exemplary embodiment, one or more of the ports may comprise an attachment unit interface (AUI) and/or one or more of the ports may comprise a physical medium dependent (PMD) interface.

Each repeater port 40 establishes a link with the corresponding network node 20 at a prescribed data rate (e.g., 1 Gb/s, 10 Gb/s, 12.5 Gb/s, 20 Gb/s, 25 Gb/s, etc.) via a network medium 50. Each repeater port 40 automatically configures to the speed of a remote network node 20 using negotiation protocols. In an exemplary embodiment, the network medium 50 may comprise up to four or more physical channels. A local network node 20 and a remote network node 30 (FIG. 3) may communicate via two or more physical channels in the medium 50. For example, Ethernet over 10 GBase-KR operates over a single backplane lane and 100 GBase-KR4 operates over four backplane lanes.

The local network node 20 (e.g., a network switch or controller) may comprise a medium access control (MAC) controller 21, a PHY device 23, and a management module 25. The management module 25 manages the operation of the MAC 21 and the PHY 23. The MAC 21, the PHY 23, and the management module 25 reside on the same integrated circuit or circuit board, in one embodiment.

The PHY device 23 interfaces with a particular physical medium 50 (e.g., backplane or copper cable) over a medium dependent interface (MDI) and/or an attachment unit interface (AUI), in various embodiments. The PHY components may be configured to handle physical layer requirements, which include, but are not limited to, packetization, data transfer and serialization/deserialization (SerDes), in instances where such an operation is required. Components of the PHY device 23 may include a physical coding sublayer (PCS) 22 and serializer-deserializer (SerDes) 24.

The SerDes 24 may comprise suitable logic, circuitry, and/or code that may be adapted to receive parallel data and serialize the data for transmission over a serial line, for example, a network, or receive serial data, for example, from a network, and convert the serial data to parallel data. The parallel data may be transferred to and from, for example, the MAC 21. The SerDes 24 typically employs an auto-negotiation routine to exchange abilities and to automatically determine a mode of operation, which may specify the link speed. Auto-negotiation (AN) circuitry 26 is shown to implement the auto-negotiation routine. Further, the SerDes 24 may have a pattern generator 43 and/or pseudorandom bit sequence (PRBS) generator 46 (e.g., firmware components).

Figure 2:
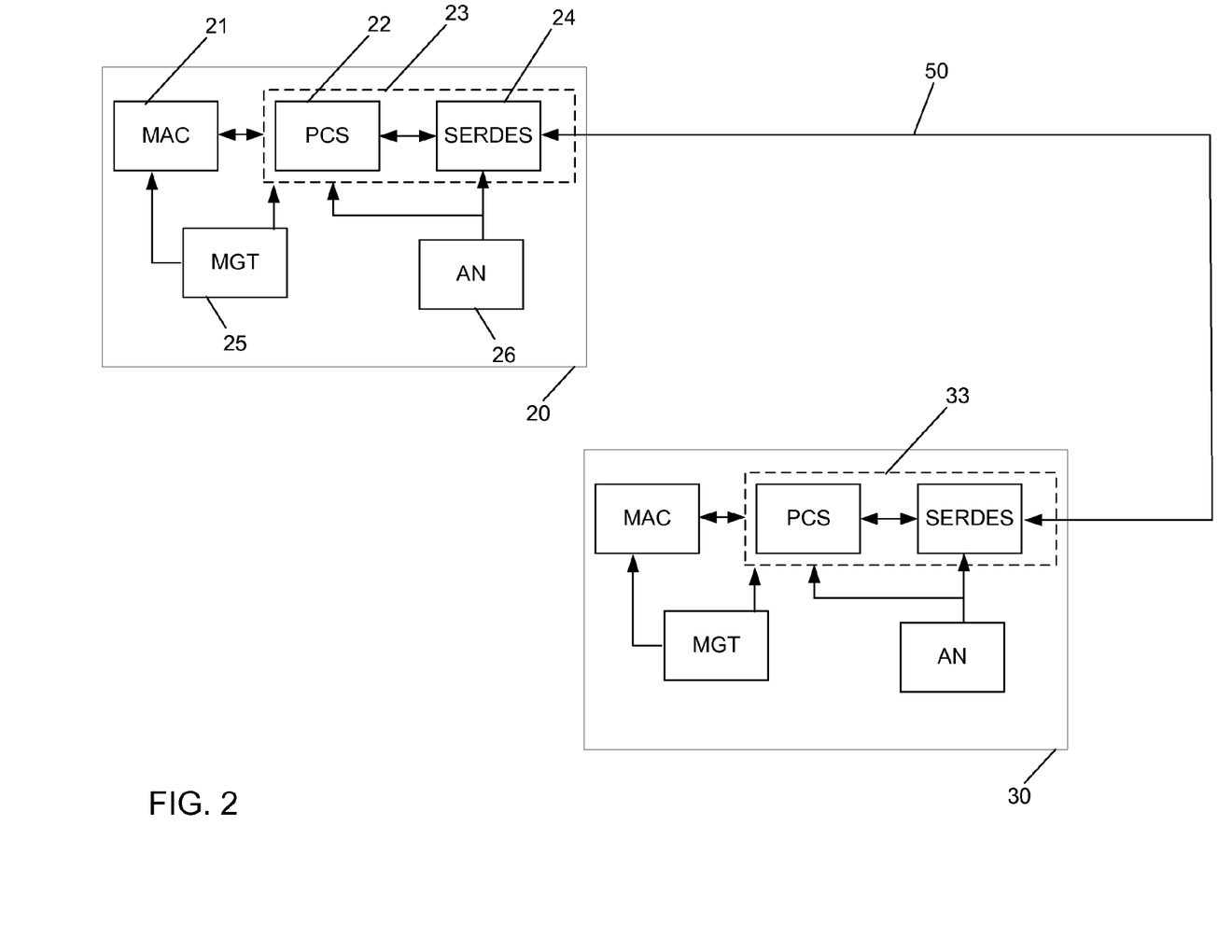
FIG. 2 is a block diagram of a network link connecting two network nodes having auto-negotiation functions according to an embodiment of the present disclosure.

The auto-negotiation routine or function allows two connected node devices to automatically detect the PHYs of each other, providing capability information of the network node 20 to the PHY 33 of a remote network node 30, as shown in FIG. 2, thereby knowing modes of operation supported by the link partner and determining the highest performance common mode between them (e.g., fastest data rate and/or lowest bit error rate). Thus, the auto-negotiation routine typically advertises and collects information on the abilities of the PHYs 23 and 33 to automatically configure an optimal mode of operation for each device. The SerDes 24 can employ, for example, an IEEE 802.3x Clause 73 auto-negotiation routine.

Figure 3:
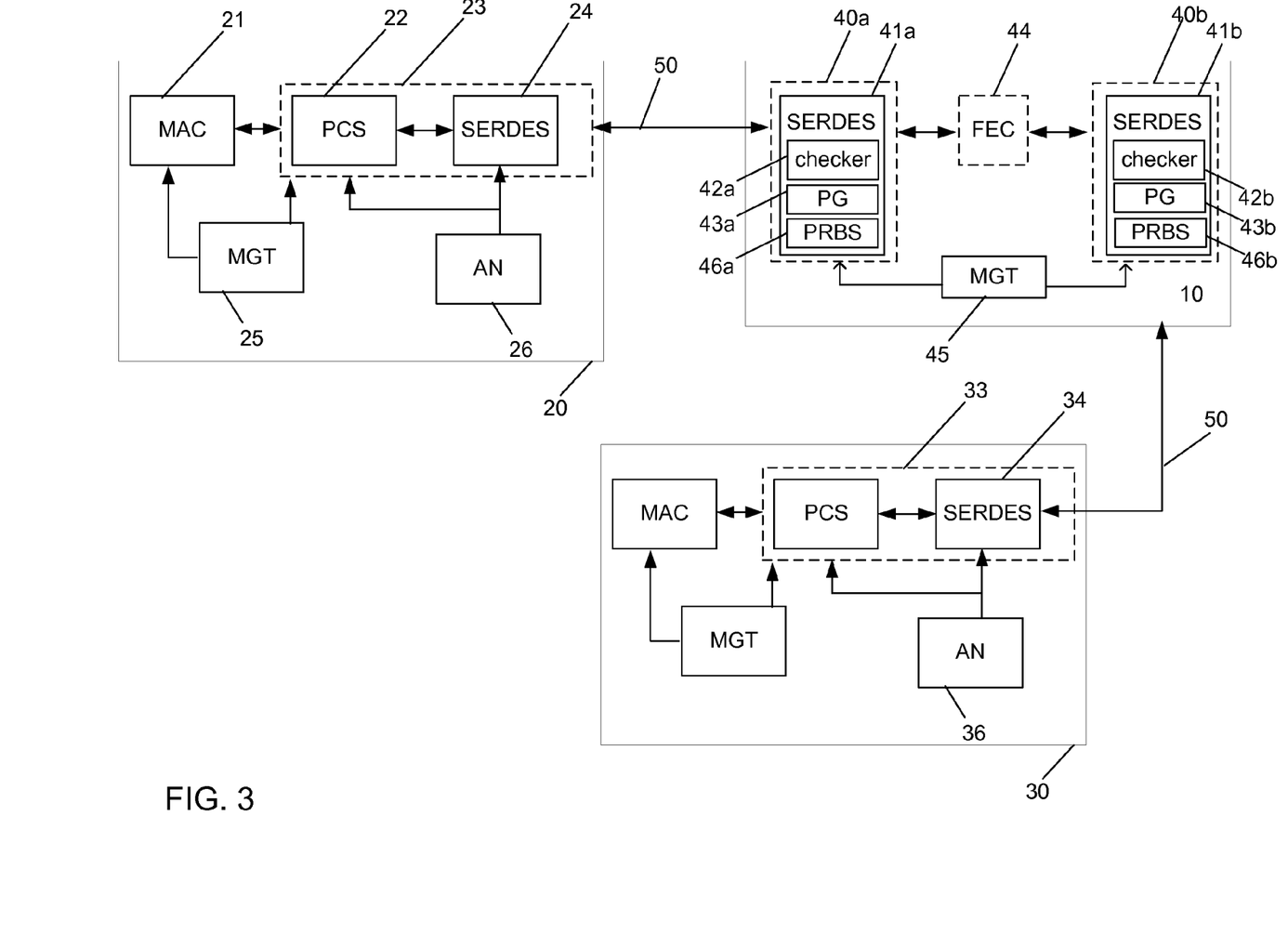
FIG. 3 is a block diagram of a network link connecting a network repeater with two network nodes having auto-negotiation functions according to an embodiment of the present disclosure.

In a Backplane Ethernet network, the maximal allowable distance between two nodes is only 1 meter. Therefore, a repeater 10 (or several repeaters) may be used to maintain a network connection between two distant nodes, as shown in FIG. 3. A potential issue is that a network connection may timeout and be reset before auto-negotiation is completed between two distant nodes 20, 30.

In accordance with the present disclosure, a new configuration or mode of operation selected by the auto-negotiation circuitry 26 of the network node 20 is relayed to the repeater 10 by an in-band signaling process. By such a process, no extra hardware pins are needed to be provided by the integrated circuit supporting the repeater logic. Further, management software 45 (if present) of the network repeater 10 is not burdened with monitoring control and status communications from the network node 20, 30. The link between the repeater 10 and the network node 20 is locally managed by the PHY device or hardware and does not affect upper layer software. Also, the solution avoids duplication of auto-negotiation functionality in the repeater 10 itself.

In an exemplary embodiment, the repeater 10 may therefore comprise PHY components that include SerDes circuitry blocks 41 (41a, 41b) for each repeater port 40. The SerDes 41 may comprise suitable logic, circuitry, and/or code that may be adapted to receive parallel data and serialize the data for transmission over a serial line, for example, a network, or receive serial data, for example, from a network, and convert the serial data to parallel data. The SerDes 41 typically employs a configuration checker 42 routine to identify a configuration setting implemented by a network node 20 and to automatically determine a mode of operation as the repeater 10 passes or forwards data to the remote network node 30. Configuration checker circuitry 42 (42a, 42b) is shown to implement the routine for identifying the configuration setting. Based on the identified configuration, the network repeater 10 employs a data switch configured for selectively connecting each network port 40 to one of a plurality of repeater cores based on a corresponding link speed or operating mode of the repeater port 40, in various embodiments. Also, the SerDes 41 may have a pattern generator 43 and/or pseudorandom bit sequence (PRBS) generator 46 (e.g., firmware components).

Figure 4A:
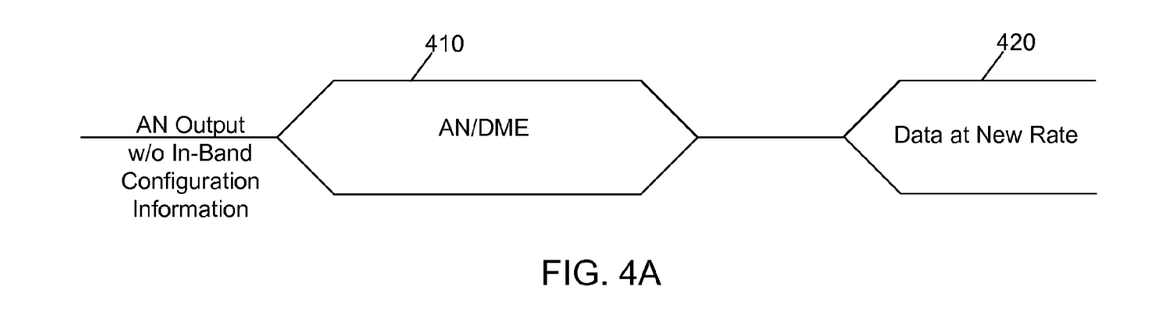
FIG. 4A is a diagram depicting an exemplary process of signaling auto-negotiation information by a network node in accordance with an embodiment of the present disclosure.

FIG. 4A demonstrates an exemplary process of signaling auto-negotiation information by the network node 20 in accordance with an embodiment of the present disclosure. For reference, the figure shows an output of the network node 20 for an auto-negotiation process without a repeater 10. Here, information ("AN/DME") 410 is transferred from the local network node 20 to the remote network node 30, so as to establish preferred speed, duplex, and/or master/slave link conditions. Transceivers of the respect network nodes 20, 30 adjust to a common configuration per the auto-negotiation protocol and can transmit data 420 at the new common rate or ode of operation.

Figure 4B:
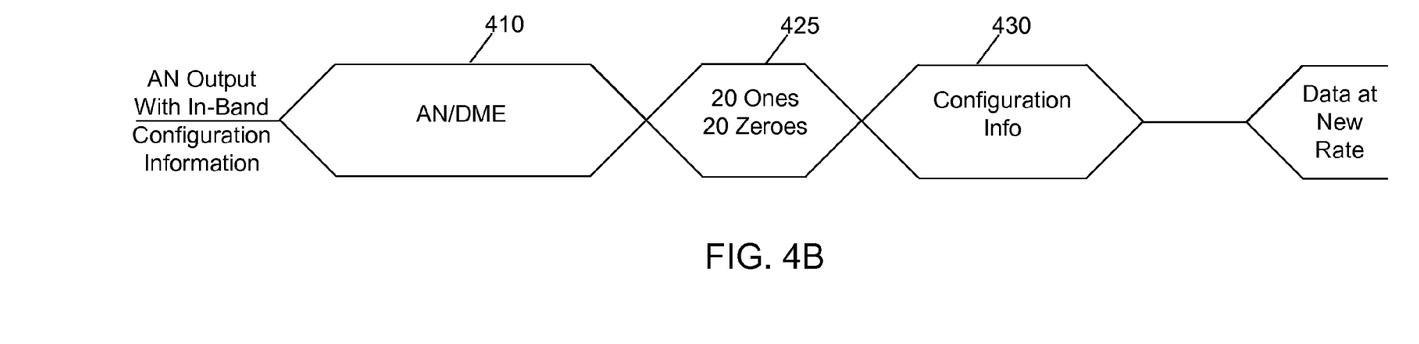
FIG. 4B is a diagram depicting an exemplary process of signaling auto-negotiation information and configuration information in accordance with an embodiment of the present disclosure.

Referring next to FIG. 4B, an output of the network node 20 for an auto-negotiation process with a repeater 10 is demonstrated. Here, information ("AN/DME") 410 is transferred from the local network node 20 to the remote network node 30, so as to establish preferred speed, forward error correction (FEC) capability, and/or proprietary encoding protocols. Transceivers (nor shown) of the respect network nodes 20, 30 adjust to a common configuration per the auto-negotiation protocol. Before, transmitting data at the new common rate, however, configuration information 430 is transmitted in-band to the repeater 10.

At the network node 20, after negotiation of rate and other information, SerDes 24 determines a desired physical medium dependent (PMD) configuration from auto-negotiation circuitry or hardware 26. Therefore, instead of switching over to the new line rate, the network node 20 first sends configuration information to the repeater 10. For example, the new rate and speed is encoded in a special configuration sequence 430 (FIG. 4B) and sent from the auto-negotiation circuitry 26 to the SerDes 24 (e.g., firmware). Such configuration information may be encoded using a message template.

A pattern generator 43 may generate a particular pattern of bits 425 (e.g., a certain length of bits, such as, but not limited to, 40 bits) that are sent by a transmitter in a repeated manner. Therefore, when the SerDes 24 in an endpoint or network node 20 wants to communicate configuration information 430 to a repeater 10, the SerDes 24 creates a 40 bit pattern 425 which has a header and information bits that is encoded and sent to the repeater. The header is designed to distinguish configuration information or signals from the auto-negotiation protocol.

In one embodiment, a receiver on the repeater 10 has a checker function or circuitry 42 (42a, 42b) that is operable to analyze incoming data for the configuration header and then decodes the configuration information upon identifying the configuration header. As previously discussed, configuration information 430 may be sent repeatedly by the network node 20. Thus, the repeater 10 is able to perform a consistency check to avoid any individual bit errors. Therefore, the network node 20 can send configuration information 430 until an acknowledgement is received from the repeater 10 (e.g., a pseudorandom bit sequence (PRBS) response).

The configuration pattern sequence is illegal or invalid under 8B/10B & AN/DME (auto-negotiation and differential Manchester encoding) protocol utilized by the AN circuitry 26. Accordingly, the pattern is different from normal traffic for easy detection and is DC balanced and run length limited to be acceptable to AC coupling requirements. For example, the PHYs 23 and 33 may decode, or look for invalid and unique code words in the received data from the network in order to detect the configuration pattern 425 and subsequent configuration information 430.

The configuration pattern 425 may be generated by the SerDes 24 in the endpoint itself. In one embodiment, the repeater's SerDes at port 40 is operable to lock to this pattern 425 sent at a 1G line rate, decode the configuration information 430, and reply back with a PRBS sequence to acknowledge the reception of configuration information. The repeater 10 may then configure both a system interface (e.g., AUI) and line interface(s) (e.g., PMD) to that new data rate or mode of operation.

Therefore, when the PRBS is received at the end point SerDes 24, the endpoint or network node 20 switches over or transitions to line rate traffic at the new data rate or mode of operation. Accordingly, the PHY device 23 and the PHY device 33 at a network node 20, 30 or the PHY devices at respective ports 40a, 40b at a repeater 10 may comprise circuitry that encodes serial data to be transmitted to the network and/or decode serial data received from the network. The encoding/decoding functionality may be part of, for example, the SerDes 24, 34, 41a, 41b or other circuit blocks in the PHY devices 33, 34, 40a, 40b. Encoding/decoding functionality may include a forward error correction (FEC) component 44 (FIG. 3) for controlling errors in data transmissions of the configuration information.

The encoded in-band scheme of the present disclosure can be employed for both single-lane PMD or multi-lane PMD mode. The scheme can be applied in multi-lane PMDs also, by prefixing the configuration information 430 at the start of every link. In addition the configuration information 430 can include items pertaining to a multi-lane PMD (e.g., indicating a dual/quad, indicating whether FEC 44 is to be used, FEC parameters, etc.).

Embodiments of the present disclosure are capable of providing a fast hardware-based, SerDes firmware controlled in-band process to inform an external repeater of the desired new configuration. Therefore, embodiments of the present disclosure allow for endpoint management software to be shielded from control/status communication burden, where real-time complicated software intervention is not required. With such embodiments, a network link can be locally managed without affecting upper layer software, and auto-negotiation functions are not duplicated between an endpoint 20 and the repeater 10. Therefore, an exemplary repeater 10 of the present disclosure can be informed of and adapted to auto-negotiation configurations without an increase in overhead (e.g., additional hardware or pins for out-of-band communications) and without undue restrictions or the need for a complex and potentially time consuming hardware and firmware based automatic rate detection scheme. Further, support for extra information in proprietary auto-negotiation extensions can be provided in updates to SerDes firmware 41, in accordance with the present disclosure.

Referring back to FIG. 3, two endpoints or network nodes 20, 30 may be connected by a link 50 having one or more repeaters 10 between them. To operate correctly, the repeater 10 should be programmed to an operating mode quickly so that a link time budget is preserved before the link 50 is at risk of being reset. This is a common implementation problem for repeaters and auto-negotiation routines. For a non-limiting example, if there is management software that is monitoring a 64 port switch with auto-negotiation functionality and each port contains a repeater, all of those ports will negotiate independently. Therefore, the management software will poll all of the ports to determine if any of them changed states and then will need to reconfigure the particular repeater(s) in time before a link times out. However, embodiments of the present disclosure can create a real-time information link between an endpoint 20 and a repeater 10 so that auto-negotiation completes before a link 50 times out and the repeater 10 is informed of a new configuration without having management software 25 intercede. If during auto-negotiation, the link 40 drops or is restarted, the repeater 10 may monitor for a "restart" link signature for the link and then reset at a compatible rate.

Figure 5:
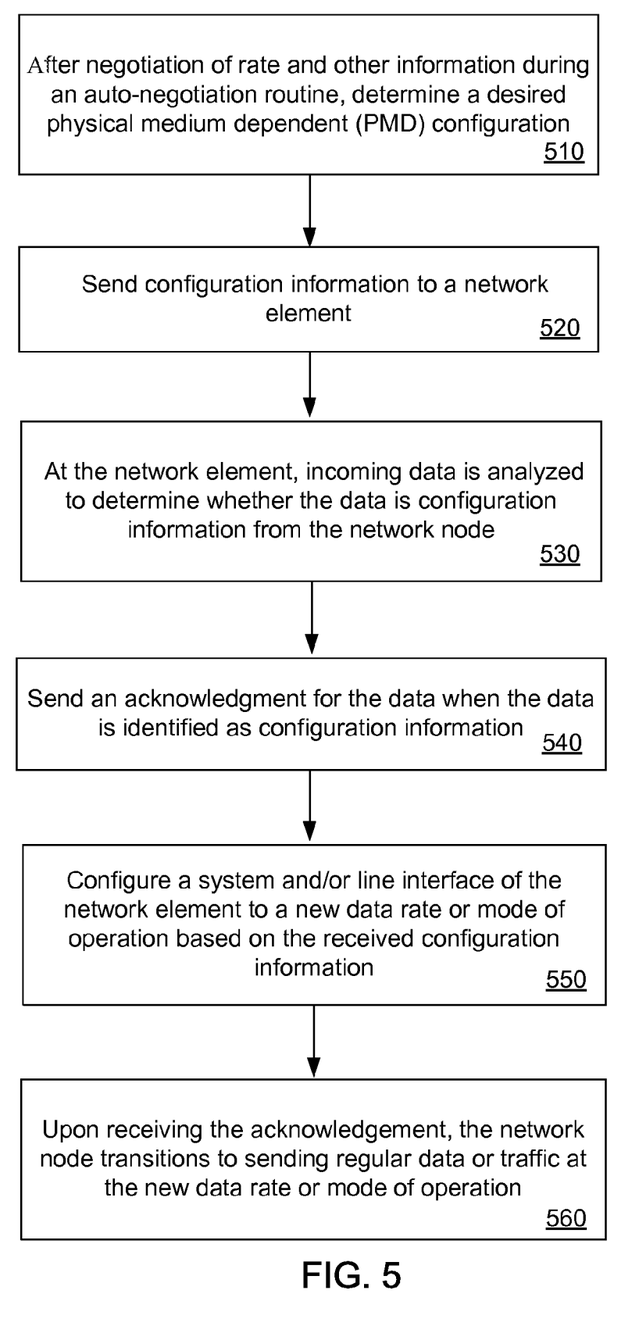
FIG. 5 is a flow chart diagram illustrating operational actions enabling automatic configuration of a network element or repeater in accordance with an embodiment of the present disclosure.

FIG. 5 provides a flow chart 500 that illustrates operational actions corresponding to FIG. 4B for enabling automatic configuration of a network element, such as a repeater 10, in accordance with an embodiment of the present disclosure. The present disclosure is not limited to this operational description. Rather, it will be apparent to persons skilled in the relevant art(s) from the teachings herein that other operational flows are within the scope and spirit of the present disclosure. In the following discussion, the actions in FIG. 5 are described.

At a network node 20, after negotiation of rate and other information during an auto-negotiation routine with a remote network node over a network link, SerDes 24 determines (510) a desired physical medium dependent (PMD) configuration from auto-negotiation circuitry or hardware 26. The SerDes 24 sends (520) configuration information to a network element, such as repeater 10. The configuration information is formatted according to a message template employed by the SerDes 24 that distinguishes the configuration information from auto-negotiation information during the auto-negotiation routine. At the network element 10, incoming data is analyzed (530) to determine whether the data is configuration information from the network node 20. The network element 10 sends (540) an acknowledgement for the data when the data is identified as configuration information. The network element 10 may then configure (550) a system and/or line interface to a new data rate or mode of operation based on the received configuration information. Accordingly, upon receiving the acknowledgement, the network node 20 transitions to sending (560) regular or normal data or traffic at the new data rate or mode of operation.

Certain embodiments of the present disclosure can be implemented in hardware, software, firmware, or a combination thereof. In one embodiment, software or firmware is stored in a memory and that is executed by a suitable instruction execution system. If implemented in hardware, as in one embodiment, the hardware may be any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the an embodiment of the present disclosure in which functions may be executed out of order from that shown or discussed, including substantially concurrently or in reverse order, depending on the functionality involved, as would be understood by those reasonably skilled in the art of the present disclosure.

As stated above, the flow chart of FIG. 5 may be considered as, but not limited to, an ordered listing of executable instructions for implementing logical functions. Such executable instructions can be embodied in any computer-readable medium for use by or in connection with an instruction execution system, apparatus, or device, such as a computer-based system, hardware processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present disclosure includes embodying the functionality of the embodiments of the present disclosure in logic embodied in hardware or software-configured mediums.

It should be emphasized that the above-described embodiments of the present disclosure are merely possible examples of implementations, merely set forth for a clear understanding of the principles of the present disclosure. Many variations and modifications may be made to the above-described embodiments without departing substantially from the spirit and principles of the present disclosure.

All such modifications and variations are intended to be included herein within the scope of this disclosure and protected by the following claims.

Therefore, having thus described various embodiments, at least the following is claimed:

1. A network system, comprising:
   a plurality of network repeater ports of a network repeater, where a port from among the plurality of network repeater ports sends and receives network data, the network repeater connecting an external network node to a second external network node; and
   a serial and deserializer (SerDes) of the network repeater associated with the port, wherein the SerDes is operable to identify a configuration setting from incoming data received from the external network node and to automatically determine a mode of operation of the network repeater based on the configuration setting before passing the network data to the second external network node,
   wherein the configuration setting is generated by the external network node based on auto-negotiation information exchanged between the external network node and the second external network node,
   wherein the SerDes is further operable to send an acknowledgement to the external network node in response to receiving the configuration setting, and
   wherein the external network node is operable to switch to the mode of operation after the acknowledgment is received from the SerDes.

2. The system of claim 1, wherein the incoming data is part of data traffic received from the external network node, the data traffic comprising the auto-negotiation information involving the external network node and the second external network node.

3. The system of claim 2, wherein the data traffic received from the external network node further comprises normal data traffic.

4. The system of claim 2, further comprising the external network node, wherein the external network node comprises a pattern generator configured to create a bit pattern identifying the configuration setting transmitted as part of the data traffic.

5. The system of claim 1, wherein the incoming data comprises a sequence of configuration bits identifiable based on a header format that is distinguishable from formatting used within an auto-negotiation protocol.

6. The system of claim 1, wherein the SerDes transitions to line rate traffic at the mode of operation.

7. The system of Claim 1, wherein the SerDes further comprises a forward error correction component for controlling errors in data transmissions of the configuration setting.

8. The system of claim 7, wherein the external network node comprises auto-negotiating circuitry.

9. The system of claim 8, wherein the external network node is configured to determine a desired physical medium dependent configuration from the auto-negotiation circuitry and to send configuration information to the port.

10. The system of claim 1, wherein the acknowledgement is a pseudorandom bit sequence (PRBS) response.

11. A method, comprising:
    receiving, by a port of a network repeater, incoming data from an external network node over a communication link, the network repeater connecting the external network node to a second external network node;
    identifying, by the network repeater, a configuration setting for the port of the network repeater from the incoming data received from the external network node;
    implementing a new mode of operation for the port of the network repeater based on the identified configuration setting; and
    forwarding, by the network repeater, the incoming data to the second external network node at the new mode of operation,
    wherein the configuration setting is generated by the external network node based on auto-negotiation information exchanged between the external network node and the second external network node,
    wherein the network repeater is operable to send an acknowledgment to the external network node in response to receiving the configuration setting, and
    wherein the external network node is operable to switch to the new mode of operation after the acknowledgment is received from the network repeater.

12. The method of claim 11, wherein the new mode of operation comprises a change in data rate for the communication link.

13. The method of claim 11, wherein the new mode of operation comprises a change in duplex settings for the communication link.

14. The method of claim 11, wherein the incoming data is part of data traffic received from the external network node, the data traffic comprising the auto-negotiation information involving the external network node and the second external network node.

15. The method of claim 11, wherein the incoming data comprises a sequence of configuration bits identifiable based on a header format that is distinguishable from formatting used within an auto-negotiation protocol.

16. The method of claim 11, further comprising determining, by the external network node, a desired physical medium dependent configuration from auto-negotiation circuitry and sending the configuration setting to the port.

17. The method of claim 16, wherein a message containing the configuration setting is formatted according to a message template that distinguishes the message from the auto-negotiation information transmitted during an auto-negotiation routine.

18. The method of claim 11, wherein the acknowledgement is a pseudorandom bit sequence (PRBS) response.

19. A non-transitory computer-readable medium having executable instructions that when executed by a hardware processor of a network repeater causes the hardware processor to:
    identify a configuration setting for a port of the network repeater from incoming data received from an external network node, the network repeater connecting the external network node to a second external network node;
    implement a new mode of operation for the port of the network repeater based on the identified configuration setting; and
    forward, by the network repeater, the incoming data to the second external network node at the new mode of operation,
    wherein the configuration setting is generated by the external network node based on auto-negotiation information exchanged between the external network node and the second external network node, wherein the network repeater is operable to send an acknowledgment to the external network node in response to receiving the configuration setting, and wherein the external network node is operable to switch to the new mode of operation after the acknowledgment is received from the network repeater.

20. The non-transitory computer-readable medium of claim 19, wherein the incoming data is part of data traffic received from the external network node, the data traffic comprising the auto-negotiation information involving the external network node and the second external network node.

* * * * *